(12) United States Patent
Codreanu et al.

(10) Patent No.: US 7,356,017 B2
(45) Date of Patent: Apr. 8, 2008

(54) DATA LOADING METHOD, TRANSMITTER, AND BASE STATION

(75) Inventors: Marian Codreanu, Oulu (FI); Djordje Tujkovic, Oulu (FI); Matti Latva-Aho, Oulu (FI)

(73) Assignee: Nokia Corporation, Espoo (FI)

( * ) Notice: Subject to any disclaimer, the term of this patent is extended or adjusted under 35 U.S.C. 154(b) by 827 days.

(21) Appl. No.: 10/780,911

(22) Filed: Feb. 19, 2004

(65) Prior Publication Data

US 2005/0185574 A1 Aug. 25, 2005

(51) Int. Cl.
*H04J 1/00* (2006.01)

(52) U.S. Cl. .................................. 370/343; 370/329
(58) Field of Classification Search ............... 370/343, 370/329
See application file for complete search history.

(56) References Cited

U.S. PATENT DOCUMENTS

| | | | |
|---|---|---|---|
| 7,099,678 B2* | 8/2006 | Vaidyanathan | 455/500 |
| 7,110,378 B2* | 9/2006 | Onggosanusi et al. | 370/334 |
| 2003/0112880 A1 | 6/2003 | Walton et al. | |
| 2004/0120411 A1* | 6/2004 | Walton et al. | 375/260 |
| 2004/0184398 A1* | 9/2004 | Walton et al. | 370/203 |
| 2005/0185728 A1* | 8/2005 | Wallace et al. | 375/267 |

FOREIGN PATENT DOCUMENTS

EP 1 185 001 A2 3/2002

WO WO 2004/021634 A1 3/2004

OTHER PUBLICATIONS

Gao, J. et al., "*On Implementation of Bit-Loading Algorithms for OFDM Systems with Multiple-Input Multiple-Output*", Vehicular Technology Conference Proceedings, 2000, Sep. 24-28, 2002, pp. 199-203.

Sampath, H. et al., "*Generalized Linear Precoder and Decoder Design for MIMO Channels Using the Weighted MMSE Criterion*".

Wong, K. et al., "*Adaptive Spatial-Subcarrier Trellis Coded MQAM and Power Optimization for OFDM Transmissions*", Vehicular Technology Conference proceedings, 2000, IEEE, May 15-18, 2000, pp. 2049-2053.

* cited by examiner

*Primary Examiner*—Chi Pham
*Assistant Examiner*—Phuc Tran
(74) *Attorney, Agent, or Firm*—Squire, Sanders & Dempsey, L.L.P.

(57) ABSTRACT

The invention is related to a data loading method in a communication system where sub-carriers include eigenmodes, comprising, for instance: arranging eigenmodes into a predetermined number of clusters, each cluster comprising eigenmodes of different quality levels; pre-allocating transmission power to the eigenmodes with the aid of the calculated required power for achieving the approximated signal-to-noise ratio; determining collective transmission power to be allocated to each cluster based on the pre-allocation; allocating collective transmission power to the eigenmodes.

24 Claims, 2 Drawing Sheets

DATA LOADING METHOD, TRANSMITTER, AND BASE STATION

FIELD

The invention relates to a data loading method in a communication system, a transmitter and a base station.

BACKGROUND

Systems based on using multiple antennas are one of the most promising techniques for achieving high data rates. By combining MIMO (multiple input multiple output) techniques with OFDM (orthogonal frequency division multiplexing) modulation, the frequency selective MIMO channel is turned into a set of frequency flat MIMO fading channels which can be individually processed.

If a channel is known at a transmitter side, the channel matrix can be decomposed for each sub-carrier using SVD (singular value decomposition). As a result a set of orthogonal sub-channels is obtained in the space domain. These elementary sub-channels are also called eigenmodes.

One prior art method to find the optimal bit and power allocation for a set of multiple parallel sub-channels (for example, for eigenmodes of a MIMO-OFDM system) is Hughes-Hartog (HH) algorithm. Hughes-Hartog algorithm is depicted in John A. C: Bingham: Multicarrier Modulation for Data Transmission: An Idea Whose Time Has Come, IEEE Communications Magazine, pp. 5-14, May 1990, which is taken herein as a reference. However, the required computational effort of Hughes-Hartog algorithm increases with the average bit rate and therefore it is not a practical solution for high bit rate systems Some sub-optimal fast loading algorithms have been proposed in Peter S. Chow, John M. Cioffi and John A. C. Bingham: A Practical Discrete Multitone Transceiver Loading Algorithm over Spectral Shaped Channels, IEEE Trans. on Communications, vol. 43, no. 2/3/4, pp. 773-775, February/March/April 1995, Robert F. H. Fischer and Johannes B. Huber: A New Loading Algorithm for Discrete Multitone Transmission, IEEE Proceeding of Global Telecommunications Conferences, vol. 1, pp. 724-728, November 1996 and Yu Wei and John M. Cioffi: On Constant Power Water-Filling", IEEE Proceeding of International Conference on Communications, vol. 6, pp. 1665-1669, June 2001 which are taken herein as a reference.

These prior art methods are developed for slow varying channels like asymmetric digital subscriber line. For such channels, the signalling overhead required, for instance, for informing a receiver about the modulation scheme of each eigenmode can be neglected due to possibility to update the transmission parameters at relatively long time intervals. However, when the channel is changing fast, as is the case in wireless systems, the transmission parameters can be kept constant only for a time period shorter than the channel coherence time and therefore the amount of signalling overhead is significant.

BRIEF DESCRIPTION OF THE INVENTION

According to an aspect of the invention, there is provided a data loading method in a communication system where sub-carriers include eigenmodes, comprising: estimating a channel matrix; calculating a singular value decomposition of the estimated channel matrix for obtaining eigenvalue estimates; defining biases between eigenvalues and eigenvalue estimates and performing a channel estimation reliability test based on the defined biases; carrying out bias compensation for eigenvalue estimates based on the defined biases; calculating equivalent power gain; arranging eigenmodes into a predetermined number of clusters, each cluster comprising eigenmodes of different quality levels; pre-allocating transmission power to the eigenmodes according to their capacity by using the calculated equivalent power gain; determining collective transmission power to be allocated to each cluster based on the pre-allocation, selecting the optimum modulation and coding scheme and allocating collective transmission power to the eigenmodes.

According to another aspect of the invention, there is provided a transmitter of a communication system where sub-carriers are divided into eigenmodes, comprising: means for estimating a channel matrix; means for calculating a singular value decomposition of the estimated channel matrix for obtaining eigenvalue estimates; means for defining biases between eigenvalues and eigenvalue estimates and performing a channel estimation reliability test based on the defined biases; means for carrying out bias compensation for eigenvalue estimates based on the defined biases; means for calculating equivalent power gain; means for arranging eigenmodes into a predetermined number of clusters, each cluster comprising eigenmodes of different quality levels; means for pre-allocating transmission power to the eigenmodes according to their capacity by using the calculated equivalent power gain; means for determining collective transmission power to be allocated to each cluster based on the pre-allocation; means for selecting the optimum modulation and coding scheme and allocating collective transmission power to the eigenmodes.

According to another aspect of the invention, there is provided a transmitter of a communication system where sub-carriers are divided into eigenmodes, configured to: estimate a channel matrix; calculate a singular value decomposition of the estimated channel matrix for obtaining eigenvalue estimates; define biases between eigenvalues and eigenvalue estimates and performing a channel estimation reliability test based on the defined biases; carry out bias compensation for eigenvalue estimates based on the defined biases; calculate equivalent power gain; arrange eigenmodes into a predetermined number of clusters, each cluster comprising eigenmodes of different quality levels; pre-allocate transmission power to the eigenmodes according to their capacity by using the calculated equivalent power gain; determine collective transmission power to be allocated to each cluster based on the pre-allocation; select the optimum modulation and coding scheme and allocating collective transmission power to the eigenmodes.

According to another aspect of the invention, there is provided a base station of a communication system where sub-carriers are divided into eigenmodes, comprising: means for estimating a channel matrix; means for calculating a singular value decomposition of the estimated channel matrix for obtaining eigenvalue estimates; means for defining biases between eigenvalues and eigenvalue estimates and performing a channel estimation reliability test based on the defined biases; means for carrying out bias compensation for eigenvalue estimates based on the defined biases; means for calculating equivalent power gain; means for arranging eigenmodes into a predetermined number of clusters, each cluster comprising eigenmodes of different quality levels; means for pre-allocating transmission power to the eigenmodes according to their capacity by using the calculated equivalent power gain; means for determining collective transmission power to be allocated to each cluster based on the pre-allocation; means for selecting the optimum modulation and coding scheme and allocating collective transmission power to the eigenmodes.

According to another aspect of the invention, there is provided a base station of a communication system, where sub-carriers are divided into eigenmodes, configured to: estimate a channel matrix; calculate a singular value decomposition of the estimated channel matrix for obtaining eigenvalue estimates; define biases between eigenvalues and eigenvalue estimates and performing a channel estimation reliability test based on the defined biases; carry out bias compensation for eigenvalue estimates based on the defined biases; calculate equivalent power gain; arrange eigenmodes into a predetermined number of clusters, each cluster comprising eigenmodes of different quality levels; pre-allocate transmission power to the eigenmodes according to their capacity by using the calculated equivalent power gain; determine collective transmission power to be allocated to each cluster based on the pre-allocation; select the optimum modulation and coding scheme and allocating collective transmission power to the eigenmodes.

Embodiments of the invention are described in the dependent claims.

The method and system of the invention provide several advantages. In a preferred embodiment of the invention, a sub-optimal low-complexity bit and power loading method that requires low signalling overhead is provided. Therefore the algorithm is especially suitable for high bit rate systems. The algorithm is also robust against channel estimation errors at the transmitter side.

LIST OF DRAWINGS

In the following, the invention will be described in greater detail with reference to the preferred embodiments and the accompanying drawings, in which.

DESCRIPTION OF EMBODIMENTS

Figure 1:
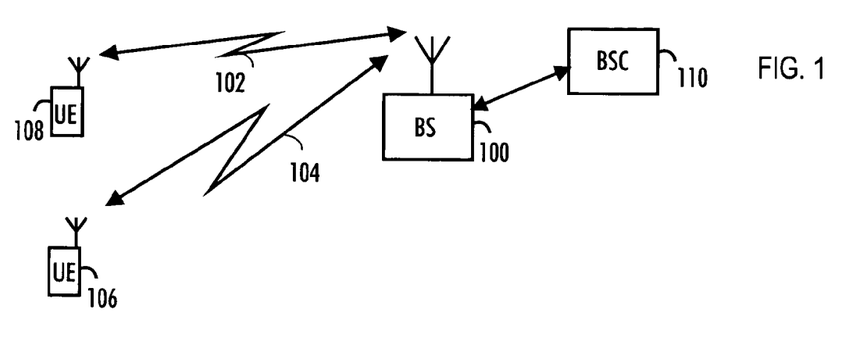
FIG. 1 shows an example of a communication system.

With reference to FIG. 1, we examine an example of a data transmission system in which the preferred embodiments of the invention can be applied. The present invention can be applied in various wireless communication systems based on MIMO-OFDM. One example of such a communication system is IEEE 802.11a wireless LAN communication system. The basic idea of OFDM is to split a high-rate data stream into parallel streams that are transmitted simultaneously over different orthogonal sub-carriers. An OFDM signal consists of a sum of sub-carriers that are modulated by using phase shift keying (PSK) or quadrature amplitude modulation (QAM). MIMO systems include multiple transmission and reception antennas. It is clear to a person skilled in the art that the method according to the invention can be applied to systems utilizing different modulation methods or air interface standards.

In MIMO-OFDM systems, the frequency selective MIMO channel is turned into a set of frequency flat MIMO channels which can be individually processed. This reduces computational complexity. Elementary orthogonal sub-channels of each sub-carrier, obtained by using SVD (singular value decomposition) of a channel matrix at each sub-carrier, can also be called eigenmodes.

The embodiments are not, however, restricted to the system given as an example but a person skilled in the art may apply the solution in other systems provided with the necessary properties.

FIG. 1 is a simplified illustration of a digital data transmission system to which the solution according to the invention is applicable. This is a part of a cellular radio system, which comprises a base station or an equivalent network element 100, which has bi-directional radio links 102 and 104 to subscriber terminals 106 and 108. The subscriber terminals may be fixed, vehicle-mounted or portable. The base station includes transmitters, for instance. From the transceivers of the base station there is a connection to an antenna unit, which establishes the bi-directional radio links to the subscriber terminal. The base station is further connected to a base station controller or an equivalent network element 110, which transmits the connections of the terminals to the other parts of the network. The base station controller controls in a centralized manner several base stations connected to it.

The cellular radio system can also communicate with other networks such as a public switched telephone network or the Internet.

If a transmitter has some knowledge about CSI (channel state information) the spectral efficiency can be increased by applying adaptive transmission techniques. In a TDD (time division duplex) based system, the channel can be estimated at the base station on the basis of a signal received in one or more selected previous uplink timeslots. The estimate may be used for link adaptation during the next down link timeslot. The link adaptation consists of modifying transmission parameters according to channel variation in order to maximise the throughput using at most the maximum transmission power and fulfilling requirements set for the reliability of the transmission. Typically, the reliability is evaluated in terms of frame error rate (FER) or bit error rate (BER).

The transmitter typically informs the receiver about the chosen transmission parameters, for instance selected eigenmodes, constellations, powers allocated to the eigenmodes and channel code parameters, using a signalling channel. The signalling overhead reduces effective capacity of the downlink channel, thus the target is to minimize it for making the usage of available capacity more efficient.

Figure 2:
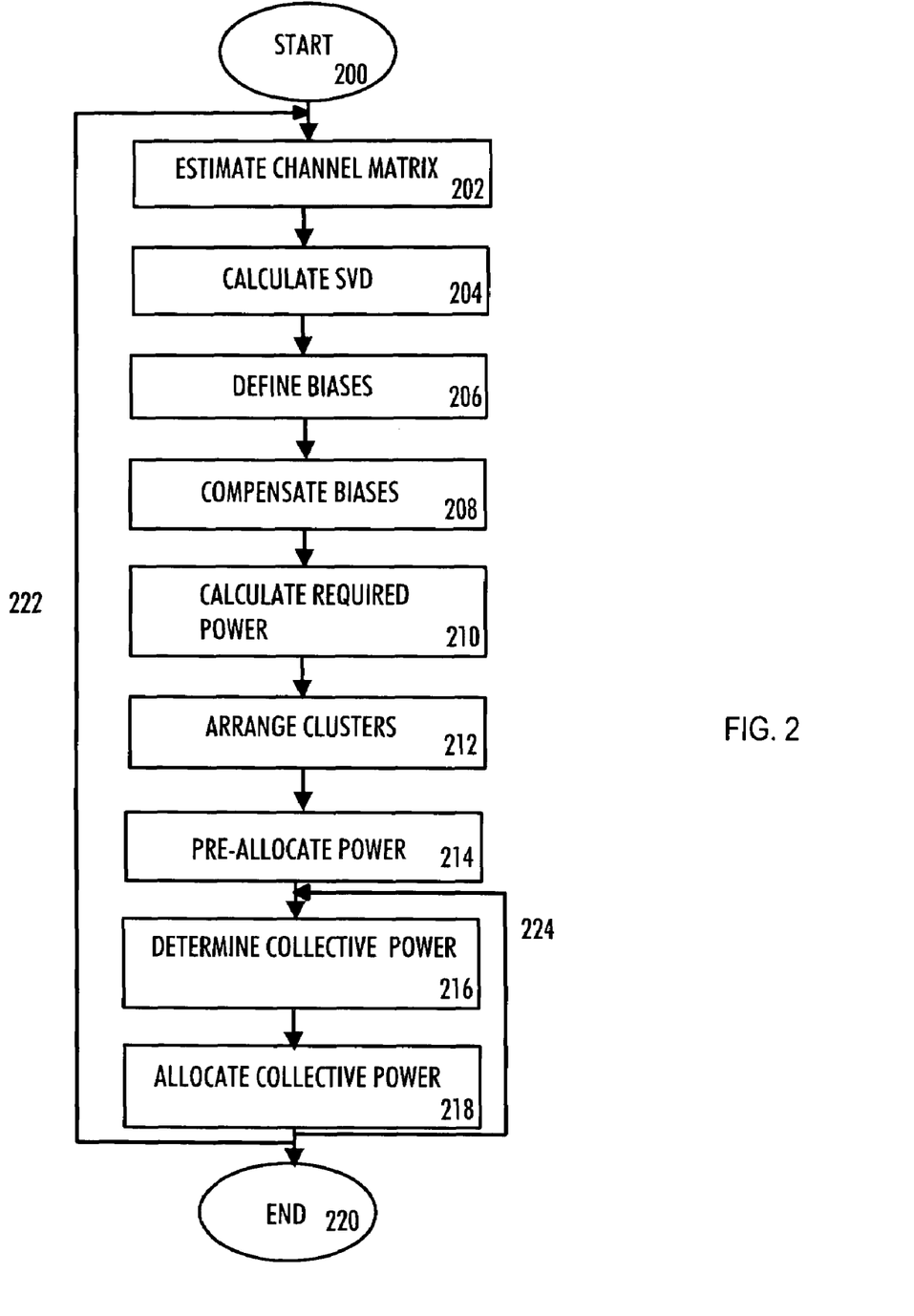
FIG. 2 is a flow chart.

Next, by the aid of FIG. 2, let us examine in further detail an embodiment of the data loading method (or algorithm). The example system used here includes two receiver antennas and at least two transmitting antennas. The scheme exploits radio channel reciprocity of TDD (time division duplex) transmission and operates in an open loop adaptation mode. Typically, for each transmitted frame, in order to maintain the selected frame error rate (FER) under the total transmitted power constraint, the modulation scheme and the allocated power to each eigenmode are adapted according to channel conditions.

If a channel is known at a transmitter side, the channel matrix can be decomposed for each sub-carrier using SVD (singular value decomposition). As a result a set of orthogonal sub-channels is obtained in the space domain. These elementary sub-channels are also called in this application eigenmodes.

For such a scenario, the optimal signalling in terms of channel capacity is usually eigenmode transmission, where a complex symbol is allocated to each eigenmode and the transmission power is allocated to the eigenmodes according to, for instance, a prior art water filling algorithm or modified water filling algorithm. The modified water filling algorithm is explained later in further detail. The process of adapting power and the amount of information to be allocated to each eigenmode is called here bit and power loading. The amount of information to be allocated to the eigenmodes varies according to the modulation level such as complex signal constellation and/or the channel coding parameters such as code rate. MIMO-OFDM eigenmode transmission is described in Kai-Kit Wong, Roger S. K. Cheng, Khaled Ben Letaief and Ross D. Murch: Adaptive Spatial-Subcarrier Trellis Coded MQAM and Power Optimization for OFDM transmissions, Proceeding of IEEE Vehicular Technology Conference, vol. 3, pp. 2049-2053, 2000, H. Sampath, P. Stoica and Arogyaswami J. Pauiraj: Generalized linear precoder and decoder design for MIMO channels using the weighted MMSE criterion, IEEE Trans on Communications, vol. 49, no. 12, pp. 2198-2206, December 2001.

The embodiment of the method provides reduced signalling overhead in relation to the number of sub-carriers by grouping eigenmodes into preferably two clusters and using the same modulation and coding scheme (MCS) for all selected eigenmodes belonging to the same cluster. The clusters preferably include the strongest and the weakest eigenmodes of each sub-carrier.

The embodiment starts in block 200.

In block 202, a channel matrix is estimated.

An estimate of the channel matrix ($\hat{H}_c$) at each sub-carrier c is provided:

$$\hat{H}_c = H_c + N_c \quad (1)$$

wherein c means a sub-carrier and $\hat{H}_c$ means the estimated channel matrix and $H_c$ means the true value of channel matrix and $N_c$ means the means channel estimation error with the entries modelled as independent Gaussian random variables with zero mean and variance $\sigma_N^2$.

Channel estimation is typically made according to selected prior art method. The channel estimation is usually based on pilot signals of the reversed frame. Variance of the error of the channel estimation ($\sigma_N^2$) is typically also estimated using an appropriate prior art method. Channel estimation is well known in prior art and therefore it is not explained here in further detail.

In block 204, singular value decomposition (SVD) of the estimated channel matrix is calculated. As a result the eigenvalues of the estimated channel matrix are obtained. Singular value decomposition is calculated typically independently for each sub-carrier.

The SVD of the estimated channel matrix is given by:

$$\hat{H}_c = \hat{U}_c \hat{\Lambda}_c \hat{V}_c^H, \quad (2)$$

wherein c means sub-carrier and $\hat{U}_c$ is an RXR (R=the number of receiver antennas equal with 2 in this example) unitary matrix contains in its columns left singular vectors of the channel matrix and $\hat{V}_c$ is an TXT (T=the number of transmitter antennas $\geq 2$ in this example) unitary matrix contains in its columns right singular vectors of the channel matrix and $\hat{V}_c^H$ means the transpose and complex conjugate (hermitian) of the matrix $\hat{V}_c$ and $\hat{\Lambda}_c$ is an RXT (R=the number of receiver antennas equal with 2 in this example, T=the number of transmitter antennas) dimensional matrix having the elements $\sqrt{\hat{\lambda}_{1,c}}$, $\sqrt{\hat{\lambda}_{2,c}}$ on the main diagonal and all other elements being zeros; the elements on the main diagonal are descending ordered $\sqrt{\hat{\lambda}_{1,c}}$, $\sqrt{\hat{\lambda}_{2,c}}$.

The matrix $\hat{V}_c$ is also used for linear pre-filtering of the signal transmitted at a sub-carrier c in order to obtain eigenmodes. Due to the channel estimation errors orthogonality between the resulted eigenmodes in each sub-carrier is usually lost. Therefore a spatial equalizer is required at the receiver side for each sub-carrier. The spatial equalizer can be implemented either in zero forcing or linear minimum mean square structure. The equalization is well known in prior art and therefore it is not explained here in further detail.

If the channel estimation is fairly accurate (channel estimation errors smaller than 10%), the instantaneous signal to noise ratio at the equalizer output can be approximated by:

$$SNR_{i,c} \approx \frac{P_{i,c}}{N_0} \lambda_{i,c} |\hat{v}_{i,c}^H v_{i,c}|^2, \quad (3)$$

wherein c means sub-carrier and i means the spatial sub-channel (eigenmode) index for a given sub-carrier and $N_0$ means the power spectral density of noise at the receiver side and $P_{i,c}$ means the power allocated at the eigenmode (i,c) and $\lambda_{i,c}$ means the square of the i'th singular value of the true channel matrix $H_c$.

$\hat{v}_{i,c}$ is the i'th right singular vector of the estimated channel matrix $\hat{H}_c$ and is given by the i'th column of matrix $\hat{V}_c$ and $\hat{v}_{i,c}^H$ means the transpose and complex conjugate (hermitian) of the vector $\hat{v}_{i,c}$ and $v_{i,c}$ is the i'th right singular vector of the true channel matrix $H_c$.

The term $|\hat{v}_{i,c}^H v_{i,c}|^2$ in equation (3) represents the loss in SNR due to the channel estimation errors. It's instantaneous values are difficult to calculate but it was found by simulations that:

$$E_{N_c} \left\{ |\hat{v}_{i,c}^H v_{i,c}|^2 \frac{\hat{\lambda}_{i,c}}{\lambda_{i,c}} \right\} \approx 1 \quad (4)$$

wherein c means sub-carrier and i means the spatial sub-channel (eigenmode) index for a given sub-carrier and $E_{N_c}\{\ \}$ means the statistical expectation operator, where the expectation is taken with respect of probability density function of $N_c$ elements ($N_c$ is the channel estimation error) and $\lambda_{i,c}$ means the square of the i'th singular value of the true channel matrix $H_c$ and $\hat{\lambda}_{i,c}$ means the square of the i'th singular value of the estimated channel matrix $\hat{H}_c$.

Based on relations (3) and (4), the average SNR (signal-to-noise ratio) loss can be compensated by increasing the instantaneous allocated power to each eigenmode with the ratio $$\frac{\hat{\lambda}_{i,c}}{\lambda_{i,c}}.$$

To implement this we need a reliable estimate of the $\lambda_{i,c}$. Eigenvalues are squares of the singular values of the channel matrix obtained by SVD.

In practise, the channel matrix itself cannot determine. Instead of the real channel matrix, the estimate is used. Correspondingly, also for eigenvalues estimates are used.

The main idea of the method is to partially compensate the bias between $\hat{\lambda}_{i,c}$ and $\lambda_{i,c}$. Notice that $\lambda_{i,c}$ are the eigenvalues of the hermitian matrix $H_c H_c^H$ and $\hat{\lambda}_{i,c}$ are the eigenvalues of the hermitian matrix $\hat{H}_c \hat{H}_c^H$.

Let's denote the entries in the 2×2 hermitian matrix $H \cdot H_c^H$ as follows:

$$H_c H_c^H = \begin{bmatrix} a_c & b_c \\ b_c^* & c_c \end{bmatrix} \quad (5)$$

wherein
$a_c, b_c, b_c^*, c_c$ represent matrix elements and
* means a complex conjugate.

By solving the characteristic equation of the matrix $H \cdot H_c^H$ the eigenvalues are given by:

$$\lambda_{1,c} = \frac{1}{2}\left(a_c + c_c + \sqrt{(a_c - c_c)^2 + 4|b_c|^2}\right) \quad (6)$$

$$\lambda_{2,c} = \frac{1}{2}\left(a_c + c_c - \sqrt{(a_c - c_c)^2 + 4|b_c|^2}\right)$$

wherein
$a_c, b_c, c_c$ are defined in (5) and
| | means absolute value.

The estimated channel matrix $\hat{H}_c$ multiplied with its' transpose complex-conjugate (Hermitian) $\hat{H}_c^H$ matrix is expressed as follows:

$$\hat{H}_c \hat{H}_c^H = \begin{bmatrix} \hat{a}_c & \hat{b}_c \\ \hat{b}_c^* & \hat{c}_c \end{bmatrix} \quad (7)$$

wherein
$\hat{a}_c, \hat{b}_c, \hat{b}_c^*, \hat{c}_c$ represent matrix elements and
* means a complex conjugate.

The eigenvalues of $\hat{H}_c \hat{H}_c^H$ are given by:

$$\hat{\lambda}_{1,c} = \frac{1}{2}\left(\hat{a}_c + \hat{c}_c + \sqrt{(\hat{a}_c - \hat{c}_c)^2 + 4|\hat{b}_c|^2}\right) \quad (8)$$

$$\hat{\lambda}_{2,c} = \frac{1}{2}\left(\hat{a}_c + \hat{c}_c - \sqrt{(\hat{a}_c - \hat{c}_c)^2 + 4|\hat{b}_c|^2}\right)$$

wherein
$\hat{a}_c, \hat{b}_c, \hat{c}_c$ are defined in (7) and
| | means absolute value.

In block 206, biases between eigenvalues $\lambda_{i,c}$ and their estimates $\hat{\lambda}_{i,c}$ are defined for channel estimation reliability test and the channel estimation reliability test is performed.

The biases between eigenvalues $\lambda_{i,c}$ and their estimates $\hat{\lambda}_{i,c}$, the terms of expressions (6) and (8), can be calculated by:

$$B_1 = E_{N_c}\{\hat{a}_c - a_c\} = T\sigma_N^2$$

$$B_2 = E_{N_c}\{\hat{c}_c - c_c\} = T\sigma_N^2$$

$$B_3 E_{N_c}\{|\hat{b}_c|^2 - |b_c|^2\} = \sigma_N^2 \|H_c\|_F^2 + T\sigma_N^4$$

$$B_4 = E_{N_c}\{(\hat{a}_c - \hat{c}_c)^2 - (a_c - c_c)^2\} = 4\sigma_N^4 \|H_c\|_F^2 + 2T\sigma_N^4 \quad (9)$$

wherein
$B_1, B_2, B_3, B_4$ are the bias terms and
$a_c, b_c, c_c$ are defined in (5) and
$\hat{a}_c, \hat{b}_c, \hat{c}_c$ are defined in (7) and
$E_{N_c}\{\}$ means the statistical expectation operator, where the expectation is taken with respect of probability density function of $N_c$ ($N_c$ is the channel estimation error) and
T is the number of transmission antennas and
$\sigma_N^2$ is variance of the error of the channel estimation and
$\|H_c\|_F^2$ means the square of the Frobenius norm of channel matrix $H_c$ and it is given by $\|H_c\|_F^2 = a_c + c_c$.

From (9) is clear that for computing bias terms $B_3$ and $B_4$ we need first to estimate the square of the Frobenius norm of the channel matrix $H_c$. An instantaneous consistent estimate is given by:

$$\overline{\|H_c\|_F^2} = \hat{a}_c + \hat{c}_c - B_1 - B_2 = \hat{a}_c + \hat{c}_c - 2T\sigma_N^2 \quad (10)$$

Based on this estimate a test for the channel estimation reliability evaluation is carried out for each sub-carrier as follows:

$$\text{if } (\overline{\|H_c\|_F^2} > 0) \quad (11)$$

the sub-carrier c will be used in the loading algorithm else the sub-carrier c will be discarded from the loading algorithm.

In block 208, bias compensation is carried out for eigenvalue estimates $\hat{\lambda}_{i,c}$.

For the eigenvalue estimation the bias terms given by (9) are used to partially compensate the bias in the terms of expression (8) as follows:

$$\hat{\lambda}_{1,c} = \frac{1}{2}\left((\hat{a}_c - B_1)^+ + (\hat{c}_c - B_2)^+ + \sqrt{[(\hat{a}_c - \hat{c}_c)^2 - \overline{B_3}]^+ + 4[|\hat{b}_c|^2 - \overline{B_4}]^+}\right) \quad (12)$$

$$\hat{\lambda}_{2,c} = \frac{1}{2}\left((\hat{a}_c - B_1)^+ + (\hat{c}_c - B_2)^+ - \sqrt{(\hat{a}_c - \hat{c}_c)^2 + 4|\hat{b}_c|^2}\right)$$

wherein
$B_1, B_2$ are the bias terms given by (9) and
$(x)^+$ means the positive value of x defined as: $(x)^+ = \max(x, 0)$ and
$\overline{B_3}$ and $\overline{B_4}$ represents the estimates of $B_3$ and $B_4$; they are obtained by replacing $\|H_c\|_F^2$ in (9) with its instantaneous estimate $\overline{\|H_c\|_F^2}$ given by (10).

For smaller eigenvalues ($\hat{\lambda}_{2,c}$ in equation (12)), the terms, which are under the square root are left uncompensated. This produces a slight underestimation of the eigenvalue causing increasing in system robustness. The eigenmodes corresponding to the eigenvalues which become negative after bias compensation, are discarded from the loading algorithm.

In block 210, the equivalent power gain is calculated.

By using the estimated eigenvalues (12) in (4) and combining with (3) we can express the equivalent power gain at the eigenmode (i,c) as follows:

$$g_{i,c} = \frac{\hat{\lambda}_{i,c}^2}{\hat{\lambda}_{i,c}} \quad (13)$$

Clearly, in case of perfect channel estimation at the transmitter side the equivalent power gain become the square of the singular value of the channel matrix $$(g_{i,c} \xrightarrow[\sigma_N^2 \to 0]{} \lambda_{i,c})$$

as is known from the prior art.

An eigenmode is an elementary sub-channel created within one sub-carrier by using SVD of the channel matrix at that sub-carrier. The eigenmodes are obtained by pre-filtering the transmitted signal with the right hand singular vector matrix.

The power required at the eigenmode (i,c) in order to obtain a given target signal to noise ratio, $SNR_t$, is given by:

$$\tilde{P}_{i,c}(SNR_t) = SNR_t \frac{N_0}{g_{i,c}} \qquad (14)$$

In the following, we will describe the bit and power loading part of the data loading method, using as an example a system with two receiving antennas and at least two transmitter antennas. The number of eigenmodes obtained in each sub-carrier is given by the minimum between the number of transmit and receive antennas (two in the considered example).

Briefly, the main idea of the method is to exploit the intrinsic spatial diversity achieved by using MIMO-OFDM transmission. In the following we present one embodiment based on turbo channel coding but it is clear to a person skilled in the art that turbo codes may be replaced by other prior art channel coding methods.

In block 212, eigenmodes are arranged into a predetermined number of clusters, each cluster comprising eigenmodes of different quality levels.

In one embodiment, 2C eigenmodes (C meaning the total number of sub-carriers) are grouped into two clusters, consisting of the strongest and the weakest eigenmodes from each sub-carrier, respectively. Except some eigenmodes corresponding to the most faded sub-carriers, a small difference between the eigenmodes gains belonging to the same cluster is experienced due to spatial diversity. Consequently, by skipping some of the most faded eigenmodes, the same MCS (modulation and coding scheme) can be used for all selected eigenmodes belonging to the same cluster and the required signalling overhead is C times reduced.

In one embodiment, each cluster is independently encoded by using single input single output (SISO) turbo code. The resulted bits are usually also interleaved and modulated. For each cluster the encoding is performed jointly in time and frequency domain, a codeword covering the selected eigenmodes from one cluster during whole transmitted frame. In this way the codeword is enlarged to achieve interleaving gain while the adaptability between clusters is still preserved.

The modulation and coding parameters (for example the complex constellation used in modulation, the coding rate) are modified according to channel conditions in order to maintain the target FER (frame error rate). Specifically, there are available a set of K distinct modulation and coding schemes (MCS), and we denote them by $b_k$, k=1, . . . , K, the spectral efficiency being provided by k'th MCS.

For each available MCS, the required SNR to achieve the target FER in additive white Gaussian noise (AWGN) channel can be obtained analytically or by preliminary simulations and the results can be stored into a look up table.

Let's denote by $\gamma_k$, k=1, . . . , K the SNR required by the k'th MCS to achieve the target FER in AWGN channel. We assume that $b_k$ are given in the ascending order $b_1 < b_2 < \ldots < b_K$ and for an efficient MCS set is required that $\gamma_1 < \gamma_2 < \ldots < \gamma_K$.

For each transmitted frame, first, the total power is divided between the clusters according with their capacities, and then, the MCS and the selected eigenmodes in each cluster are independently optimized to maximize the throughput subject to equal SNR constraint for all selected eigenmodes.

Thus, in block 214, transmission power is pre-allocated to the eigenmodes according to their capacity by using the calculated equivalent power gain.

In practise, the amount of information allocated to an eigenmode is limited not only by the noise power but also by the maximum rate achieved by the most spectral efficient MCS (modulation and coding scheme). Therefore, in power allocation, instead of prior art water filling a modified water filling method can be used for taking into account the saturation of signal-to-noise ratio of the eigenmode and the average signal-to-noise ratio gap.

In the modified water filling, the power to be pre-allocated for an eigenmode is expressed:

$$P_{i,c}^{(MWF)} = \min\left[\left(\mu - \frac{N_0}{g_{i,c}}G\right)^+, \frac{N_0}{g_{i,c}}\gamma_K\right], \qquad (15)$$

wherein
MWF means modified water filling
i is a cluster index,
c is a carrier index,
$N_0$ means spectral density of noise at the receiver,
G is the average signal-to-noise ratio gap between the Shannon capacity and the spectral efficiency provided by the MCS set,
$(x)^+$ means the positive value of x defined as: $(x)^+ = \max(x, 0)$ and
$\gamma_K$ means the SNR required by the most spectral efficient MCS to achieve the target FER in AWGN (Additive White Gaussian Noise) channel
$g_{i,c}$ means the equivalent power gain at the eigenmode (i,c) given by (13)
µ means the "water level" and it is found from the maximum transmit power constraint:

$$\sum_{i=1}^{2}\sum_{c=1}^{C} P_{i,c}^{(MWF)} = P_T \qquad (16)$$

wherein
$P_T$ means the maximum transmit power
C means the total number of sub-carriers.

When the modified water filling method described above is used, less power is allocated to some eigenmodes than if the prior art water filling method was used. These eigenmodes are called saturated eigenmodes because although the amount of allocated power can be increased, the amount of information transmitted using these eigenmodes has already reached the maximum e.g. is saturated.

In block 216, based on the power pre-allocation of block 214, collective power to be allocated to each cluster is determined. The collective power allocated to a cluster can be expressed as follows:

$$P_i = \sum_{c=1}^{C} P_{i,c}^{(MWF)}, \quad (17)$$

wherein

C means the number of sub-carriers, c is the current sub-carrier,

Σ means a summing operation and $P_{i,c}^{(MWF)}$ is obtained from equation (15).

In block 218, transmission power is allocated to the eigenmodes and the optimum modulation and coding scheme (MCS) is selected for each cluster.

The clusters are independently optimised by searching for the MCS that provides maximum throughput when the collective power $P_i$ is allocated to the eigenmodes according to the target FER (frame error rate), under equal signal-to-noise constraint. This is, in practise, typically equivalent with the maximisation over the MCS set of the product between the maximum number of eigenmodes selectable using a certain MCS and the spectral efficiency provided by that MCS.

The maximisation is preferably applied in the same manner to each cluster. Therefore the cluster index (I) is omitted for brevity. By denoting with P the collective power allocated to the cluster, the index of the optimum MCS, $k_0$, which maximises the throughput under the total transmitted power and the maximum FER constraints can be written as:

$$k_0 = \underset{k=1,2,\dots,K}{\arg\max} b_k \left( \underset{S \subset \{1,2,\dots,C\}: \sum_{c \in S} \tilde{P}_c(\gamma_k) \leq P}{\max} |S| \right) = \underset{k}{\arg\max} b_k s_k, \quad (18)$$

wherein

S is a subset of the set of eigenmode indexes with cardinality |S|, $s_k$ represents the maximum number of eigenmodes that can be selected using the k'th modulation scheme, $\tilde{P}_c(\gamma_k)$ is given by (14) $\left(\gamma_k \frac{N_0}{g_c}\right)$ C means the number of carriers, c is the current carrier, $b_k$ means the spectral efficiency (number of bits per transmitted complex symbol) provided by k'th MCS.

The values $s_k$ can be calculated using the following algorithm:

Step1: arranging in a descending order the equivalent eigenmode power gains $g_c$. The arranging process means mathematically that the indexes vector $$j = [j_1, j_2, \dots, j_C], \quad (19)$$

such that $g_{j_1} > g_{j_2} > \dots > g_{j_C}$ is found.

Step2: computing the vector $w = [w_1, w_2, \dots, w_C]$, with each entry given by $$w_c = N_0 \sum_{n=1}^{c} \frac{1}{g_{j_n}}, \quad (20)$$

wherein $N_0$ means the power spectral density of noise at the receiver side an c is the index of the entry and n means the summation index, $j_n$ means the n'th entry in the indexes vector j given by (19)

$g_{j_n}$ means the equivalent power gain of the $j_n$'th eigenmode in the current cluster Σ means the summation operation.

Step 3: Let $s_0 = C$ and $\gamma_0 = 0$. For k=1 to K, let $s_k = s_{k-1}$ and if $w_{s_k} \gamma_k > P$ decrease the number of selected eigenmodes, $s_k = s_{k-1}$, until the power constraint, $w_{s_k} \gamma_k < P$, is satisfied. Every time when the power constraint is satisfied the corresponding value $s_k$ is saved.

Using the values $s_k$ provided by the previously presented algorithm, the optimum MCS, $k_0$, is found by using (18) and the powers allocated to the cluster's eigemodes are computed based on (14) as follows:

$$P_{j_n} = \begin{cases} \tilde{P}_{j_n}(\gamma_{k_0}) = \gamma_{k_0} \frac{N_0}{g_{j_n}} & \text{if } n \leq s_{k_0} \\ 0 & \text{if } n > s_{k_0} \end{cases} \quad (21)$$

wherein $j_n$ means the n'th entry in the indexes vector j given by (19)

$P_{j_n}$ means the power allocated to the $j_n$'th eigenmode in the current cluster $k_0$ means the index of the selected MCS in the current cluster $\gamma_{k_0}$ means the SNR required by the selected MCS ($k_0$) at the current cluster to achieve the target FER in AWGN channel $s_{k_0}$ means the number of the selected eigenmodes in the current cluster If correlation between antennas is strong and/or signal-to-noise-ration is low, it is possible that the number of selected eigenmodes at the weakest cluster is small and the resulted code word is very short. In such a case, the performance of codes may decrease and the target FER (frame error rate) is not maintained. In this case, the weakest cluster is not used and the power pre-allocated to the weakest cluster is reused by the strongest cluster. The arrow 224 depicts this procedure.

The method ends in block 220. The arrow 222 depicts one possibility of repeating the method.

Figure 3:
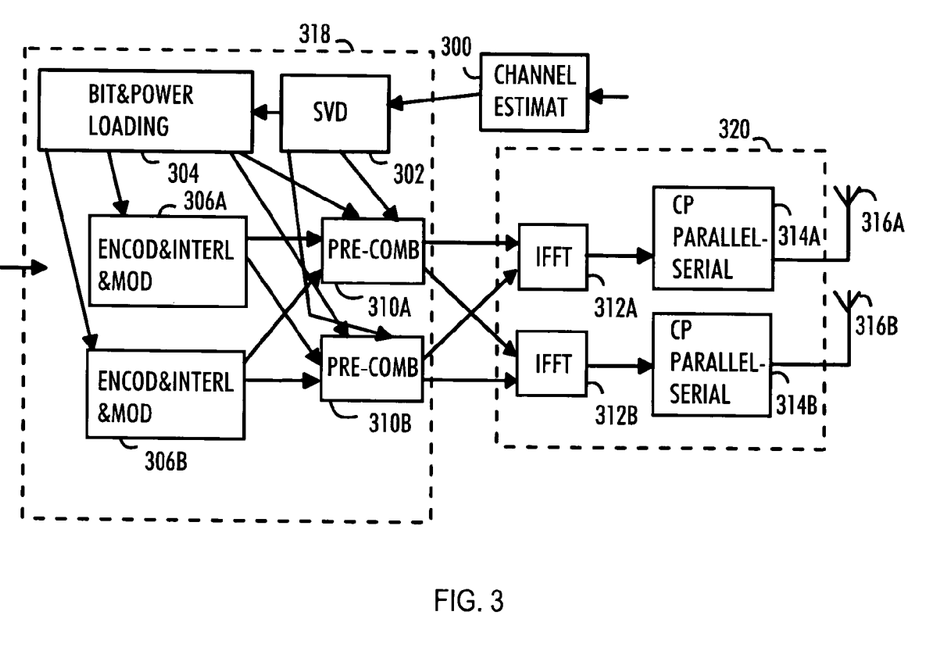
FIG. 3 illustrates an example of a transmitter structure.

Next, an example of a transmitter structure according to an embodiment of the data loading method described above is depicted in further detail by the aid of FIG. 3. It is obvious for a skilled person that the structure of a transmitter may vary from what is depicted in FIG. 3.

The present invention can be applied in various wireless communication systems based on MIMO-OFDM. One example of such a communication system is IEEE 802.11 a wireless LAN communication system. In FIG. 3, there is depicted only a part of an OFDM transmitter focusing on the transmitter blocks required by the loading method. It is obvious to a person skilled in the art that the transmitter may also include elements other than those illustrated in FIG. 3.

The transmitter described here is thought to be constructed of two parts: of pre-processor 318 and of OFDM-modulator 320. The data loading method described above with the aid of FIG. 2 is carried out mainly in bit and power loading block 304 which is a part of the pre-processor 318.

The embodiment of the data loading method described above is based on that the transmitter has prior knowledge of the radio channel. The radio channel can be estimated at a receiver being coupled to the transmitter on the basis of one or more signals received in selected previous timeslots. The link adaptation consists of modifying transmission parameters according to channel variation in order to maximise the throughput using at most the maximum transmission power and fulfilling requirements set for the reliability of the transmission. Typically, the reliability is evaluated in terms of frame error rate (FER) or bit error rate (BER).

The receiver being coupled to the transmitter is not depicted in FIG. 3 for the sake of clarity. The receiver is in this embodiment a prior art MIMO-OFDM receiver.

The transmitter typically informs the receiver about the chosen transmission parameters, for instance selected eigenmodes, constellations, powers allocated to the eigenmodes and channel code parameters, using a signalling channel.

Channel estimation block 300 carries out channel estimation for singular value decomposition SVD which in turn is carried out in block 302. Both the channel estimation and SVD are described above with the aid of FIG. 2.

Encoding and interleaving blocks 306A-306B carry out channel coding, interleaving and modulation. In one embodiment, channel coding is carried out by encoding each cluster independently by using a single input single output (SISO) turbo code. For each cluster the encoding is performed jointly in time and frequency domain, a codeword covering the selected eigenmodes from one cluster during whole transmitted frame. In this way the codeword is enlarged to achieve interleaving gain while the adaptability between clusters is still preserved. The resulted bits are usually also interleaved and modulated using some prior art interleaving and modulation methods.

In the linear pre-combining blocks 310A-310B, the complex symbols generated in the blocks 306A-306B are scaled according to the powers allocated to each eigenmodes in block 304 and then the transmitted signal at each sub-carrier is filtered with the right hand singular matrix $\hat{V}_c$ (see FIG. 2, block 204). The number of pre-combining blocks is equal to the number of sub-carriers.

In OFDM-modulator of the example of FIG. 3, an IFFT is carried out in IFFT blocks 312A-312B. It is obvious to a skilled person that the number of blocks may vary according to the implementation. Typically, it is equal to the number of transmit antennas. Then, in blocks 314A-314B, the signal is converted from parallel to serial form and a cyclic prefix is added.

The OFDM-signal is then conveyed via a DAC (digital-to-analogue converter) to the antenna 316A-316B. The number of antennas vary according to the implementation. In MIMO systems, there are several antennas.

OFDM-systems are well known in the art.

Even though the invention is described above with reference to an example according to the accompanying drawings, it is clear that the invention is not restricted thereto but it can be modified in several ways within the scope of the appended claim.

We claim:

1. A data loading method in a communication system where sub-carriers include eigenmodes, the method comprising:

estimating a channel matrix;

calculating a singular value decomposition of the estimated channel matrix for obtaining eigenvalue estimates;

defining biases between eigenvalues and eigenvalue estimates and performing a channel estimation reliability test based on the defined biases;

carrying out bias compensation for eigenvalue estimates based on the defined biases;

calculating equivalent power gain;

arranging eigenmodes into a predetermined number of clusters, each cluster comprising eigenmodes of different quality levels;

pre-allocating transmission power to the eigenmodes according to their capacity by using the calculated equivalent power gain;

determining collective transmission power to be allocated to each cluster based on the pre-allocation; and selecting the optimum modulation and coding scheme and allocating collective transmission power to the eigenmodes.

2. The method of claim 1, wherein the number of clusters is two and each cluster includes the strongest and the weakest eigenmodes of each sub-carrier.

3. The method of claim 1, wherein the pre-allocation of transmission power is carried out by using water filling or modified water filling power allocation method.

4. The method of claim 1, wherein the communication system is a combined multiple-input-multiple output and orthogonal frequency division multiplexing system.

5. The method of claim 1, wherein the transmission power allocating to eigenmodes is started from the weakest cluster.

6. The method of claim 1, wherein the optimum modulation and coding scheme which maximizes the throughput under the total transmitted power and the maximum frame error rate constraints is found by using:

$$k_0 = \underset{k=1,2,\ldots,K}{\arg\max} \, b_k \left( \underset{S \subset \{1,2,\ldots,C\} : \sum_{c \in S} \tilde{P}_c(\gamma_k) \leq P}{\max} |S| \right) = \underset{k}{\arg\max} \, b_k s_k.$$

7. The method of claim 1, wherein the power required at the eigenmode (i,c) in order to obtain a given target signal to noise ratio, $SNR_t$, is given by:

$$\tilde{P}_{i,c}(SNR_t) = SNR_t \frac{N_0}{g_{i,c}}.$$

8. The method of claim 1, wherein according to the modified water filling, the power to be pre-allocated for an eigenmode is expressed:

$$P_{i,c}^{(MWF)} = \min\left[ \left( \mu - \frac{N_0}{g_{i,c}} G \right)^+, \frac{N_0}{g_{i,c}} \gamma_K \right].$$

9. The method of claim 1, wherein the powers allocated to the cluster's eigenmodes are computed as follows:

$$P_{j_n} = \begin{cases} \tilde{P}_{j_n}(\gamma_{k_0}) = \gamma_{k_0} \dfrac{N_0}{g_{j_n}} & \text{if } n \leq s_{k_0} \\ 0 & \text{if } n > s_{k_0} \end{cases}.$$

10. The method of claim 1, wherein the clusters are encoded.

11. A transmitter of a communication system where sub-carriers are divided into eigenmodes, the transmitter comprising:
an estimating unit configured to estimate a channel matrix;
a calculating unit configured to calculate a singular value decomposition of the estimated channel matrix for obtaining eigenvalue estimates;
a defining unit configured to define biases between eigenvalues and eigenvalue estimates and performing a channel estimation reliability test based on the defined biases;
a carrying unit configured to carry out bias compensation for eigenvalue estimates based on the defined biases;
a gain calculating unit configured to calculate equivalent power gain;
an arranging unit configured to arrange eigenmodes into a predetermined number of clusters, each cluster comprising eigenmodes of different quality levels;
a pre-allocating unit configured to pre-allocate transmission power to the eigenmodes according to their capacity by using the calculated equivalent power gain;
a determining unit configured to determine collective transmission power to be allocated to each cluster based on the pre-allocation; and
a selecting unit configured to select the optimum modulation and coding scheme and allocating collective transmission power to the eigenmodes.

12. The transmitter of claim 11, further comprising:
power pre-allocating unit configured to pre-allocate transmission power by using water filling or modified water filling power allocation method.

13. The transmitter of claim 11, wherein the communication system is a combined multiple-input-multiple output and orthogonal frequency division multiplexing system.

14. The transmitter of claim 11, further comprising:
an allocating unit configured to allocate transmission power to eigenmodes starting from the weakest cluster.

15. The transmitter of claim 11, further comprising:
a searching unit configured to search for the modulation and coding scheme which maximizes the throughput under the total transmitted power and the maximum frame error rate constraints can be written as $$k_0 = \arg\max_{k=1,2,\ldots,K} b_k \left( \max_{S \subset \{1,2,\ldots,C\} : \sum_{c \in S} \tilde{P}_c(\gamma_k) \leq P} |S| \right) = \arg\max_{k} b_k s_k.$$

16. The transmitter of claim 11, wherein the power required at the eigenmode (i,c) in order to obtain a given target signal to noise ratio, $SNR_t$, is given by:

$$\tilde{P}_{i,c}(SNR_t) = SNR_t \frac{N_0}{g_{i,c}}.$$

17. The transmitter of claim 11, wherein according to the modified water filling, the power to be pre-allocated for an eigenmode is expressed:

$$P_{i,c}^{(MWF)} = \min\left[ \left( \mu - \frac{N_0}{g_{i,c}} G \right)^+, \frac{N_0}{g_{i,c}} \gamma_K \right].$$

18. The transmitter of claim 11, wherein the powers allocated to the cluster's eigemodes are computed as follows:

$$P_{j_n} = \begin{cases} \tilde{P}_{j_n}(\gamma_{k_0}) = \gamma_{k_0} \frac{N_0}{g_{j_n}} & \text{if } n \leq s_{k_0} \\ 0 & \text{if } n > s_{k_0} \end{cases}.$$

19. The transmitter of claim 11, further comprising:
an encoding unit configured to encode clusters.

20. A transmitter of a communication system where sub-carriers are divided into eigenmodes, configured to
estimate a channel matrix,
calculate a singular value decomposition of the estimated channel matrix for obtaining eigenvalue estimates,
define biases between eigenvalues and eigenvalue estimates and performing a channel estimation reliability test based on the defined biases,
carry out bias compensation for eigenvalue estimates based on the defined biases,
calculate equivalent power gain,
arrange eigenmodes into a predetermined number of clusters, each cluster comprising eigenmodes of different quality levels,
pre-allocate transmission power to the eigenmodes according to their capacity by using the calculated equivalent power gain,
determine collective transmission power to be allocated to each cluster based on the pre-allocation, and
select the optimum modulation and coding scheme and allocating collective transmission power to the eigenmodes.

21. A base station of a communication system where sub-carriers are divided into eigenmodes, the base station comprising:
an estimating unit configured to estimate a channel matrix;
a calculating unit configured to calculate a singular value decomposition of the estimated channel matrix for obtaining eigenvalue estimates;
a defining unit configured to define biases between eigenvalues and eigenvalue estimates and performing a channel estimation reliability test based on the defined biases;
a carrying unit configured to carry out bias compensation for eigenvalue estimates based on the defined biases;
a gain calculating unit configured to calculate equivalent power gain;
an arranging unit configured to arrange eigenmodes into a predetermined number of clusters, each cluster comprising eigenmodes of different quality levels;
a pre-allocating unit configured to pre-allocate transmission power to the eigenmodes according to their capacity by using the calculated equivalent power gain;
a determining unit configured to determine collective transmission power to be allocated to each cluster based on the pre-allocation; and
a selecting unit configured to select the optimum modulation and coding scheme and allocating collective transmission power to the eigenmodes.

22. A base station of a communication system, where sub-carriers are divided into eigenmodes, configured to
estimate a channel matrix,
calculate a singular value decomposition of the estimated channel matrix for obtaining eigenvalue estimates, define biases between eigenvalues and eigenvalue estimates and performing a channel estimation reliability test based on the defined biases, carry out bias compensation for eigenvalue estimates based on the defined biases, calculate equivalent power gain, arrange eigenmodes into a predetermined number of clusters, each cluster comprising eigenmodes of different quality levels, pre-allocate transmission power to the eigenmodes according to their capacity by using the calculated equivalent power gain, determine collective transmission power to be allocated to each cluster based on the pre-allocation, and select the optimum modulation and coding scheme and allocating collective transmission power to the eigenmodes.

23. A transmitter of a communication system where sub-carriers are divided into eigenmodes, the transmitter comprising:

estimating means for estimating a channel matrix;

calculating means for calculating a singular value decomposition of the estimated channel matrix for obtaining eigenvalue estimates;

defining means for defining biases between eigenvalues and eigenvalue estimates and performing a channel estimation reliability test based on the defined biases;

carrying means for carrying out bias compensation for eigenvalue estimates based on the defined biases;

gain calculation means for calculating equivalent power gain;

arranging means for arranging eigenmodes into a predetermined number of clusters, each cluster comprising eigenmodes of different quality levels;

pre-allocating means for pre-allocating transmission power to the eigenmodes according to their capacity by using the calculated equivalent power gain;

determining means for determining collective transmission power to be allocated to each cluster based on the pre-allocation; and selecting means for selecting the optimum modulation and coding scheme and allocating collective transmission power to the eigenmodes.

24. A base station of a communication system where sub-carriers are divided into eigenmodes, the base station comprising:

estimating means for estimating a channel matrix;

calculating means for calculating a singular value decomposition of the estimated channel matrix for obtaining eigenvalue estimates;

defining means for defining biases between eigenvalues and eigenvalue estimates and performing a channel estimation reliability test based on the defined biases;

carrying means for carrying out bias compensation for eigenvalue estimates based on the defined biases;

gain calculation means for calculating equivalent power gain;

arranging means for arranging eigenmodes into a predetermined number of clusters, each cluster comprising eigenmodes of different quality levels;

pre-allocating means for pre-allocating transmission power to the eigenmodes according to their capacity by using the calculated equivalent power gain;

determining means for determining collective transmission power to be allocated to each cluster based on the pre-allocation; and selecting means for selecting the optimum modulation and coding scheme and allocating collective transmission power to the eigenmodes.

* * * * *